Figure 1:
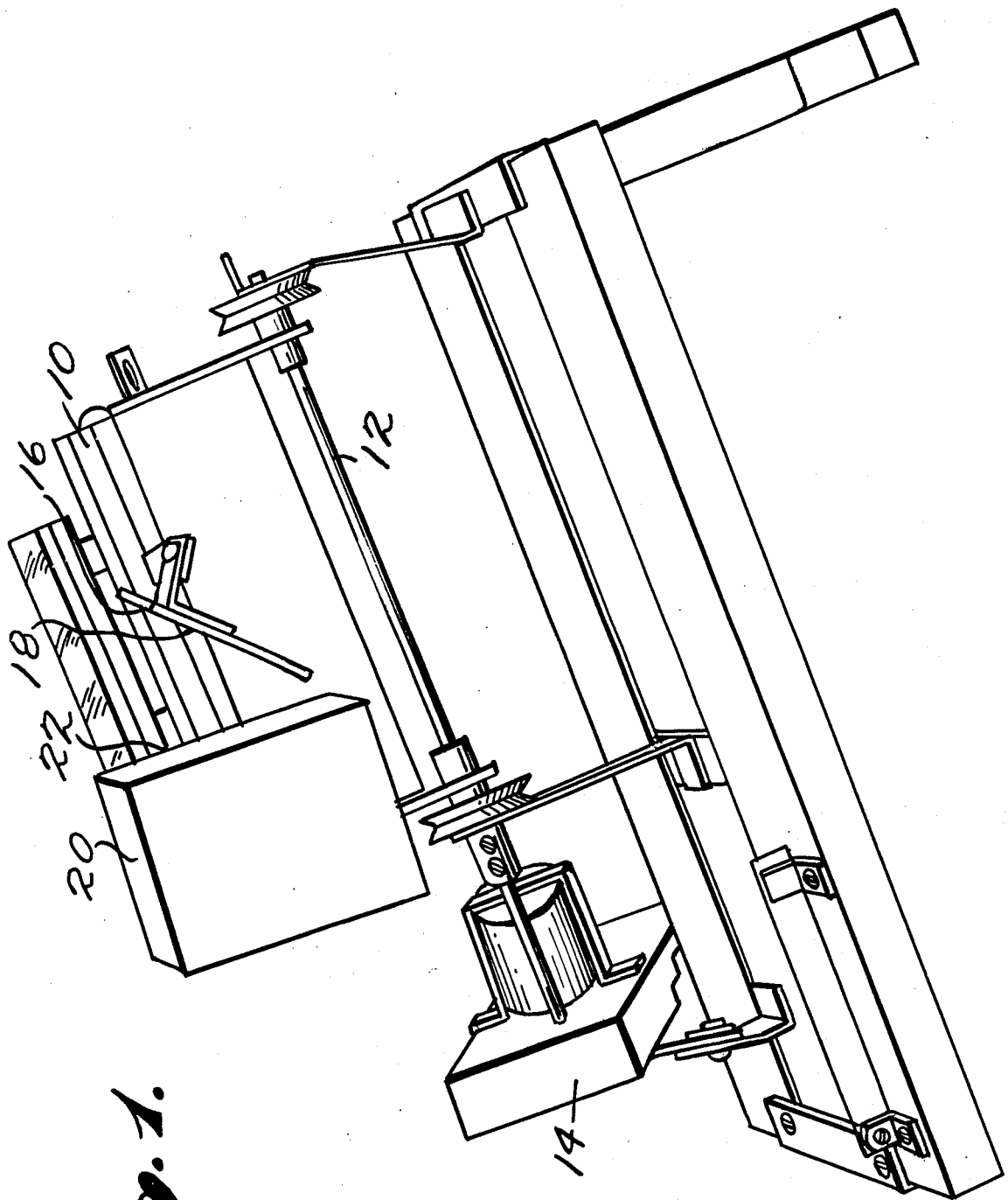

United States Patent [19]

Young

[11] 4,190,766
[45] Feb. 26, 1980

[54] SUN TRACKING SYSTEM

[75] Inventor: Danny J. Young, Tyler, Tex.

[73] Assignee: James W. Fair, Tyler, Tex.

[21] Appl. No.: 826,833

[22] Filed: Aug. 22, 1977

[51] Int. Cl.² .............................................. G01J 1/20
[52] U.S. Cl. .............................................. 250/203 R
[58] Field of Search ................... 250/203 R; 356/141, 356/152

[56] References Cited

U.S. PATENT DOCUMENTS 3,346,738  10/1967  Rogers et al. ................... 250/203 R Primary Examiner—David C. Nelms
Assistant Examiner—Darwin R. Hostetter
Attorney, Agent, or Firm—Cushman, Darby & Cushman

[57] ABSTRACT

A sun tracking system having at least one photo-sensor for each tracking axis, wherein a small inclined mirror, blackened except for a small reflective aperture, reflects a spot of light on a predetermined surface fixed with respect to the mirror. The position of the spot on the surface is in accordance with the relative alignment of the mirror to the sun. A photo-sensor associated with a given axis is disposed on the surface at a position corresponding to the desired alignment of the device to the sun. A further photo-sensitive device can be disposed in close proximity to the first photo-sensor to effect positive activation of a motor to correct misalignment, illumination of the first photo-sensor inhibiting the motor and for compensating for changes in ambient light. A simple transistor-relay circuit for effecting correction of alignment is also disclosed.

30 Claims, 4 Drawing Figures

U.S. Patent Feb. 26, 1980 Sheet 3 of 4 4,190,766

SUN TRACKING SYSTEM

BACKGROUND OF THE INVENTION

The present invention relates to a sun tracking system for aligning a body with the sun.

Many devices, such as parabolic reflectors, fresnel lenses, various hot air or solar engines, and solar collectors require that the device be accurately aligned with the sun to function efficiently. It is thus desirable, to maintain a solar collector in continual alignment with the sun, tracking the relative movement of the sun throughout the entire day. However, the track that the sun follows from sunrise to sunset varies on a daily basis. Accordingly, tracking means responsive to the actual position of the sun must be utilized.

The prior art tracking systems have generally been extremely complex and expensive. Examples of prior art sun tracking systems are described in U.S. Pat. Nos. 3,098,934 issued in 1963 to Wilson et al., 3,177,367 issued in 1965 to Brown, 3,305,686 issued in 1967 to Carter et al., 3,891,843 issued in 1975 to Parkin, 3,917,942 issued in 1975 to McCay, 3,986,021 issued in 1976 to Hitchcock and 3,996,917 issued in 1976 to Trihey. Other systems utilize two photocells facing the sun and relatively disposed at an angle of 60°. The photocells are connected in a bridge circuit, and when one cell receives more radiation than another the circuit becomes unbalanced. A driving motor is activated in the appropriate direction until equilibrium is restored by pointing the cells directly into the sun. It should be appreciated, however, that the relative disposition of the photocells in such a system is relatively critical, and hence requiring close tolerance manufacturing processes.

The present invention provides a simple and inexpensive sun tracking system, not requiring close manufacturing tolerances or complex compensation circuitry. Briefly, the present invention utilizes an angled reflective surface to produce a discrete spot of light on a predetermined surface, in fixed relation to the reflective surface. The position of the spot of light on the predetermined surface is indicative of the relative position of the sun with respect to the reflective surface. The reflective surface and predetermined surface are fixed to the body to be aligned with the sun. A photo-sensitive device is mounted on the predetermined surface at a position illuminated by the spot when the reflective surface, and hence the body, is at the desired alignment with the sun. The photo-sensitive device is utilized to inhibit an otherwise activated motor.

When the sun moves out of alignment with the reflective surface, the photo-sensitive device is no longer illuminated, and the motor, no longer inhibited, effects a rotation of the device in the direction of the sun's travel until the spot once more illuminates the photo-sensitive device to again inhibit the motor. In the preferred embodiment, as will be described, a second photo-sensitive device is disposed in close proximity to the first and used to effect a positive activation of the motor in compensation for changes in ambient light. Limit switches are utilized to define the tracking range, and to cause the unit to be restored to an initial position, e.g., an easterly-most position in the morning.

The predetermined surface can be disposed so that is not directly illuminated by sunlight. However, it should be appreciated that such a disposition is not necessary when utilizing separate inhibit and activation photo-sensitive devices in that the effects of ambient light can be cancelled, as will be explained. Further, additional photo-sensitive means can be included to inhibit the operation of the device when the ambient light is below a given threshold value, e.g., during the night.

Figure 2:
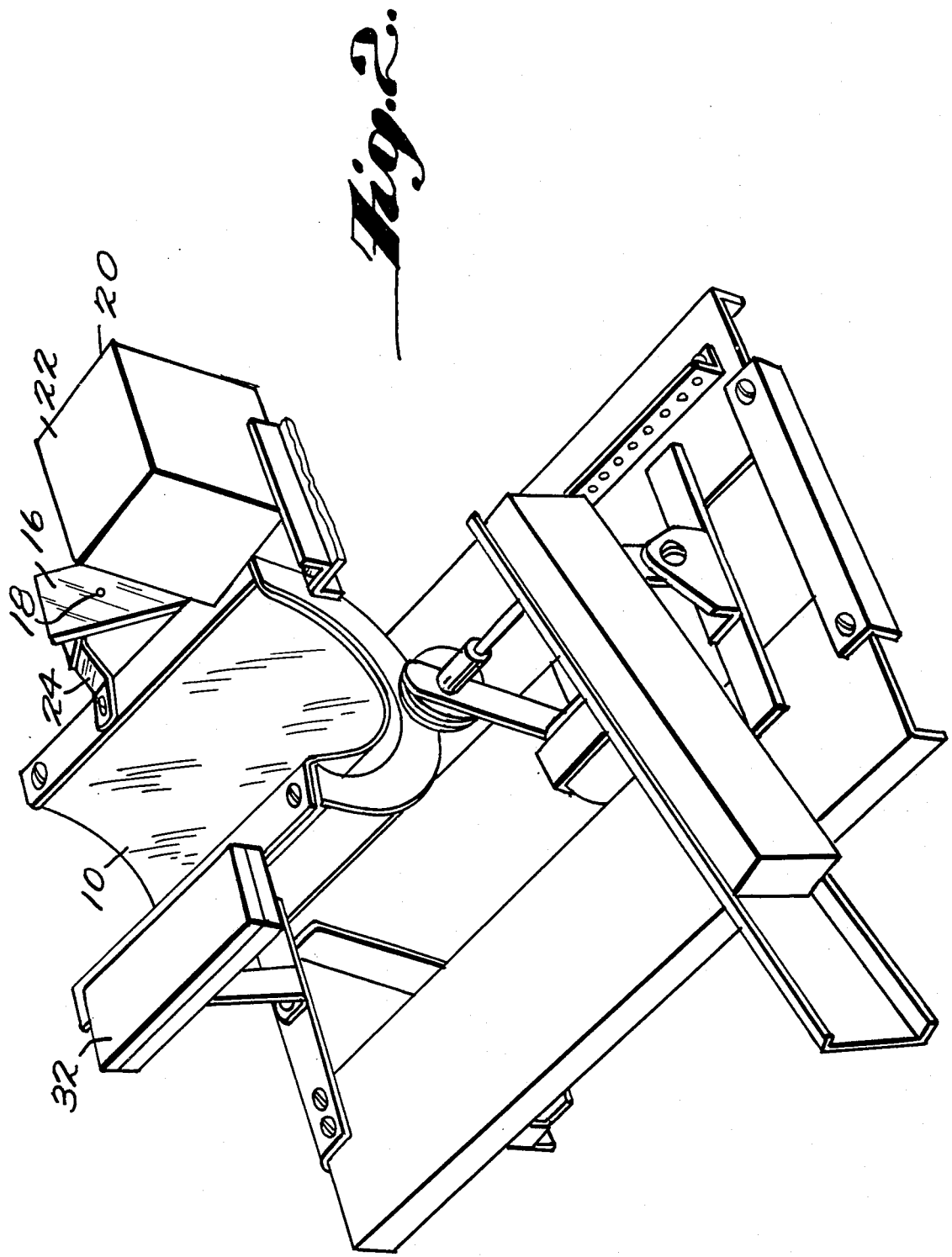
Figure 3:
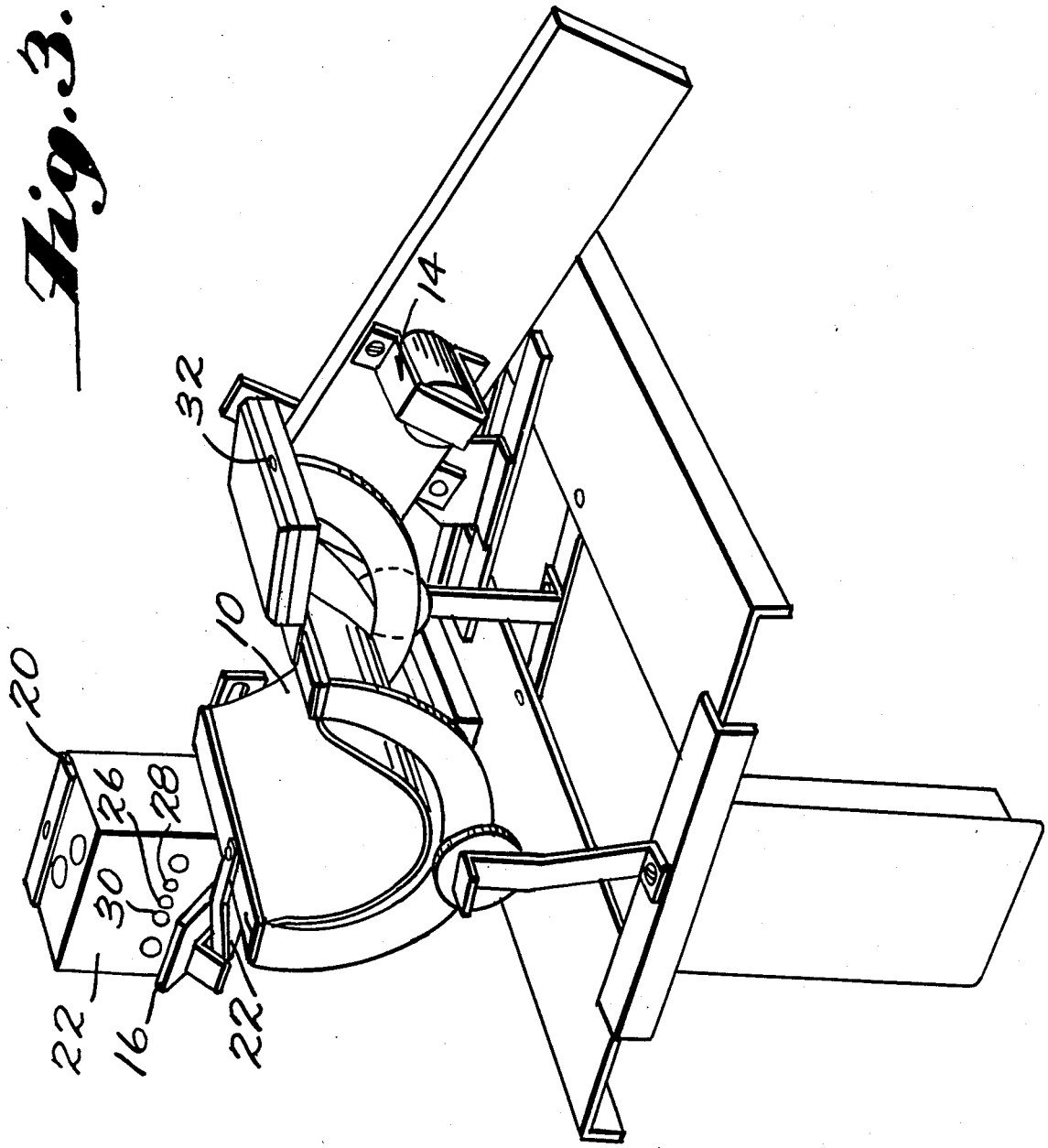
Figure 4:
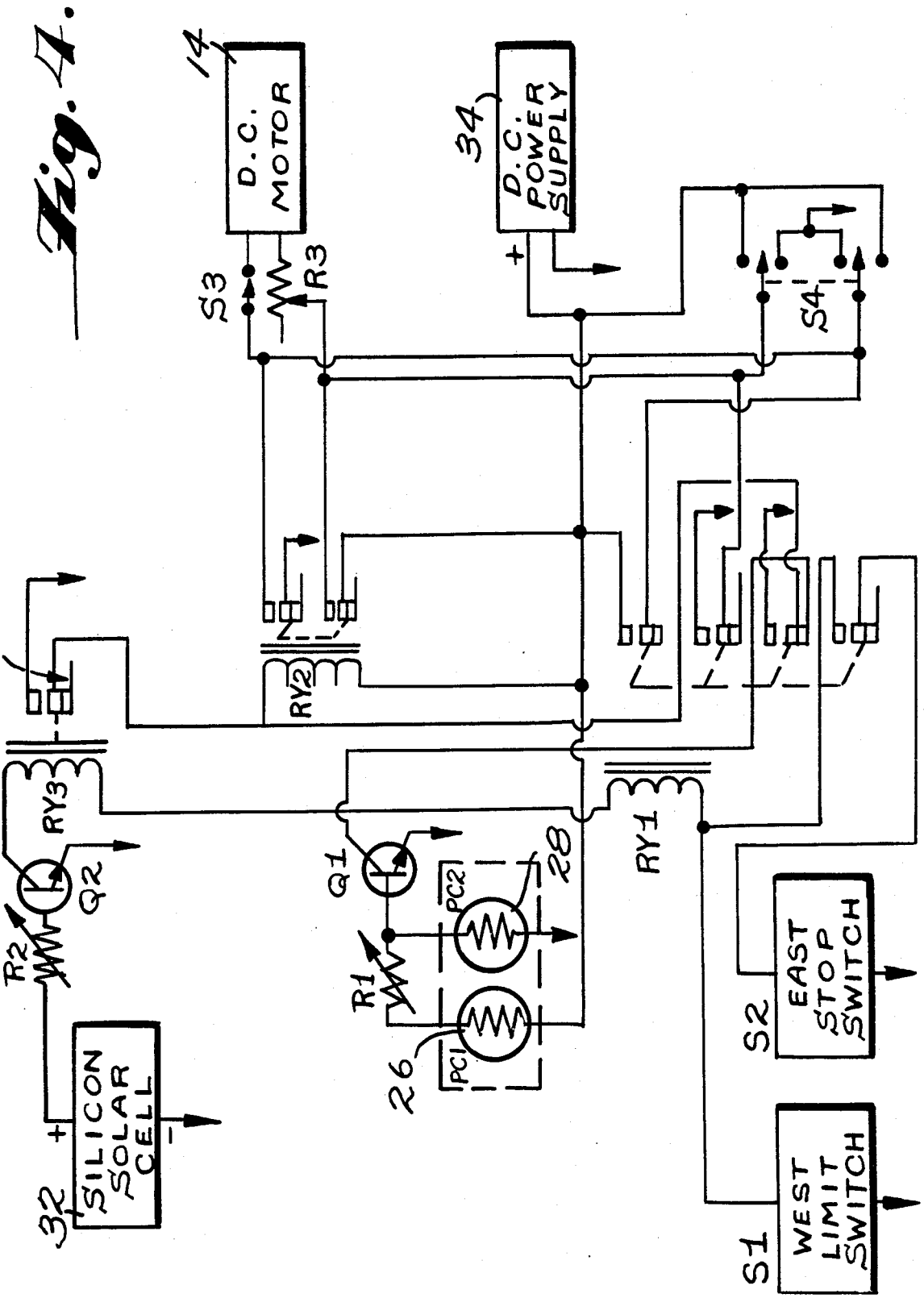

A preferred exemplary embodiment of the present invention will hereinafter be described with reference to the appended drawing, wherein:

FIGS. 1, 2 and 3 are pictorial views of a solar collector utilizing an exemplary sun tracking system in accordance with the present invention; and FIG. 4 is a schematic diagram of suitable exemplary servo circuitry for a two photo-sensor tracking system.

Referring now to FIGS. 1, 2 and 3 there is shown a solar concentrator unit utilizing a tracking system in accordance with the present invention to track the sun through its east to west movement from sunrise to sunset. It should be appreciated, that while only east-west tracking is here described, the entire unit can be mounted on a platform, and the platform adapted to track north-south (altitude) excursions by the sun using the same techniques here described for east-west tracking. Solar concentrator 10 is mounted on a shaft 12 for rotation about a generally north-south directed axis. Shaft 12 can be slightly tilted in, for example, a northerly direction, when altitude tracking is to be omitted. Shaft 12 is coupled to a suitable DC motor and gearing assembly 14.

The sun tracking system comprises a reflective surface, such as a mirror 16, fixed, suitably by bolting, to the side of concentrator 10, facing a circuitry enclosure 20 also fixed to the side of collector 10, and specifically facing a surface 22 of enclosure 20. Mirror 16 is blackened except for a small aperture 18, best seen in FIG. 2. Mirror 16 is preferably mounted to concentrator 10 by means which permits initial alignment, as will be explained, such as a rigid but malleable generally planar arm 24, or by other means well known in the art such as a ball and socket mechanism.

The blacking of mirror 16 may be accomplished by painting the mirror, excepting the aperture, with a non-reflective black paint, or a masking material such as, for example, black felt, can be applied or deposited and fixed to the mirror surface. An inhibit photo-sensor, preferably a photo-resistor, as will be explained, is mounted in a predetermined position on surface 22. The predetermined position of inhibit photo-sensor 26 is chosen in accordance with the relative disposition of enclosure 20 and mirror 16, particularly with aperture 18. The exact positioning of inhibit photocell 26 on surface 22, however, is not critical, in view of the initial alignment procedures, as will be explained.

Further photo-sensors 28 and 30 can be mounted in close proximity to inhibit photo-sensor 26, for positive activation of motor 14 and compensation for changes in ambient light, as will be explained. In the presently preferred embodiment, a single positive activation photo-sensor 20, is disposed on the easterly side of inhibit photo-sensor 26 such that it is illuminated when the sun moves out of alignment with collector 10 in a westerly direction. Second positive activation photo-sensor 30 can be utilized, if desired, where motor 14 does not include internal braking provisions, to correct for overshoot. A further photo-sensor, preferably a silicon solar cell 32 is also included, fixed to concentrator 10, for sensing the ambient light level, as will be explained.

Mirror 16 is initially aligned with inhibit photo-sensor 26 by manually bringing the concentrator 10 into instantaneous alignment with the sun. Such alignment can be determined by, for example, rotating the collector until the maximum output from solar cell 32 is achieved. Mirror 16 is then adjusted, by, for example bending malleable arm 24 until the spot reflected from aperture 18 illuminates inhibit photo-sensor 26. It should be appreciated, that the present invention thus avoids the critical matching tolerances generally required in prior art sun tracking systems.

In general, the tracking system then operates with motor 14 normally energized, and being inhibited when concentrator 10 is in proper alignment, and inhibit photo-sensor 26 illuminated. This is suitably accomplished by coupling motor 14 to a DC power supply through a relay, connection being provided when the relay is unenergized, and connecting photo-resistor 26 in the base circuit of a transistor coupled to the activation coil of the relay, such that the transistor is conductive only when photo-resistor 26 is illuminated. The connection between the power supply and motor 14 is thus broken when concentrator 10 is properly aligned and the illumination of photo-resistor 26 renders the transistor conductive. Such a circuit, however, is relatively sensitive to changes in ambient light. Accordingly, the preferred embodiment of the present invention utilizes in addition to inhibit photo-resistor 26 a positive activation photo-resistor 28, which effectively desensitizes the system to variations in ambient light. Such control circuitry is shown in FIG. 4.

Referring now to FIG. 4, photo-resistor 26 is connected in series with a variable resistance R1 between a positive power supply and the base of a NPN transistor Q1. Photo-resistor 28 is shunted across the base of transistor Q1 to ground reference potential. Transistor Q1 is connected in a common emitter fashion, with emitter connected to ground potential and the collector connected through a contacts operated by a relay RY1, and the coil of a second relay RY2 to a DC supply 34 and through further contacts connected across the relay coil RY2, operated by further relay RY3 to ground. The sets of contacts operated by relay RY1 are normally closed, and are of the latching type, and RY1 is responsive to the state of a normally open west limit switch S1, as will be explained. The activation coil of relay RY3 is connected to the collector of an NPN transistor Q2, the base of which is connected to solar cell 32 through a variable resistor R2. Motor 14 is connected to the contacts controlled by relay RY2 through an ON-OFF switch S3 and a speed control potentiometer R3. A center OFF switch S4, is also provided, coupled between DC power supply 34 and motor 14, to allow manual operation of concentrator 10, for the initial alignment procedure.

As noted above, mirror 16 is initially aligned such that photo-resistor 26 is illuminated by a reflected spot of light when the concentrator is properly aligned with the sun. In addition, during the initial set-up procedure, variable resistor R1 is adjusted until transistor Q1 is conducting with photo-resistor 26 illuminated by low level reflected light (as compared to the level of the spot on a bright sunlit day and variable resistor R2 is adjusted so that transistor Q2 is rendered non-conductive when the sun sets in the west.

After the initial adjustments, typical operation of the tracking system is as follows. When the sun rises, solar cell 32 produces a voltage output, causing transistor Q2 to conduct. Current thus flows through the activation coil of relay RY3, causing the contacts of RY3 to switch, thereby disconnecting one end of the coil of relay RY2 from ground potential and making relay RY2 responsive to the ON or OFF condition of transistor Q1.

As the sun rises, photoresistor 28 is first illuminated by the spot of reflected light from blackened mirror 16. When illuminated, the resistance of photo-resistor 26 decreases, removing or reducing the positive potential supplied to the base of transistor Q1, and rendering it non-conductive. Turning transistor Q1 off deenergizes relay RY2, causing its contacts to switch and thereby connect DC supply 34 to motor 14. Activation of motor 14 rotates shaft 12, and hence concentrator 10, towards the west until the spot of light reflected from aperture 18 illuminates inhibit photo-resistor 26 indicating alignment. Illumination of photoresistor 26 decreases its resistance while the resistance of photo-resistor 28, no longer illuminated, increases. Transistor Q1 is thus rendered conductive and relay RY2 is again energized to remove the voltage from DC motor 14 and stop the movement of concentrator 10. DC motor 14 will remain inhibited until the sun moves westwardly to remove the spot of light from photo-resistor 26 and again illuminate photoresistor 28, whereupon the above sequence reoccurs.

At the end of the sun tracking day, the concentrator will move against normally open west limit switch S1, thereby completing a current path through the activation coil of relay RY1. Relay RY1 is thus energized, and its contacts will apply a negative voltage to motor 14 to move the concentrator assembly back towards the east. As noted above, the contacts of relay RY1 are of the latching type, and the connection is maintained even after concentrator 10 moves away from west limit switch S1, allowing the switch to re-open. The contact is maintained until the concentrator returns to the initial easterly position, whereupon it will open a normally closed east stop switch S2. Contact with concentrator 10 opens stop switch S2 to release the latching stop switches of relay RY1. When the concentrator assembly is returned to the initial easterly position, solar cell 32 reduces in output appreciably, rendering transistor Q2 non-conductive and causing relay RY2 to remain in an energized state, disconnecting motor 14 from power supply 34 until the sun again rises.

As noted above, the control circuitry of FIG. 4 is relatively insensitive to ambient light. When the sunlight is very bright, both photo-resistors 26 and 28 will have decreased resistance due to the ambient light. However, it should be noted, that the resistances of photo-resistors 26 and 28 will be reduced by approximately equal amounts. Thus, where the resistance of photo-resistor 28 decreases and tends to decrease the bias to transistor Q1, the decrease in resistance of photo-resistor 26 operates to increase the bias voltage on Q1 and offset the decreased drop across photo-resistor 28. Similarly, when the ambient light is low, as when, for example, the sun is partially obscured by clouds, the change in resistance of photo-resistors 26 and 28 increase by approximately equal amounts. Thus, while the increased resistance of photo-resistor 26 decreases the applied bias voltage to transistor Q1, the increased voltage drop across photoresistor 28 still provides enough bias to the base of transistor Q1 to maintain it in a conducting state.

It should be appreciated, that if the sun is obscured for an extended period of time, the sun may move in a westerly direction by an amount which causes the reflected spot to overshoot photo-resistor 28. Further circuitry, (not shown) can be included to sense such a condition, and to activate motor 14 until alignment is again achieved. It should also be appreciated that photo-sensors other than photo-resistors can be utilized. For example, light activated silicon controlled rectifiers, or infrared detectors are suitable. Further, various indicators, such as pilot lamps or LEDs could be utilized to indicate various circuit conditions, if desired. In addition, a shaft encoder, or a potentiometer connected to shaft 12 to increase or decrease in resistance in accordance with the shaft position connected in series with a calibrated meter, can be utilized to provide indication of the relative concentrator direction.

It will be understood that the above description is of illustrative embodiments of the present invention, and that the invention is not limited to the specific form shown. Modifications may be made in the design and arrangement of the elements, as will be apparent to those skilled in the art, without departing from the spirit or scope of the invention as expressed in the attended claims.

What is claimed is:

1. A sun tracking system for aligning a body with the sun comprising:
    reflector means, comprising a reflective surface and a mask contiguous to said reflective surface having an aperture therein, for reflecting a spot of sunlight on positions along a path, the position of said spot along said path being indicative of the alignment of said reflector means with the sun, said reflector means being fixedly disposed with respect to said body;
    motor means for, when not inhibited, rotating said body, and said reflector means in a direction in accordance with the relative motion of the sun and said body; and
    photo-sensor means, disposed on said path at a position indicative of alignment between said body and sun, for generating a signal to inhibit said motor means when illuminated by said spot.

2. The sun tracking system of claim 1, further including second photo-sensor means, responsive to ambient light from the sun, for enabling said motor means when illuminated, and disabling said motor means when not illuminated by the sun.

3. The sun tracking system of claim 2, wherein said photo-sensor means comprises:
    a transistor, conductive in response to a potential of predetermined magnitude applied to the control electrode thereof;
    a photo-sensitive resistance, said photo-resistance decreasing in response to illumination thereof, and being connected between said control electrode and a power supply, whereby the potential at said control electrode is made to exceed said threshold potential to render said transistor conductive when said photo-resistance is illuminated by said spot; and
    a relay, responsive to current through said transistor, for selectively connecting said motor means to a power source, said relay being activated in response to current through said transistor to disconnect said motor means from the power supply.

4. The sun tracking system of claim 1, further including second photo-sensor means, responsive to ambient light from the sun, for enabling said motor means when illuminated, and disabling said motor means when not illuminated by the sun.

5. The sun tracking system of claim 4, wherein said photo-sensor means comprises:
    a transistor, conductive in response to a potential of predetermined magnitude applied to the control electrode thereof;
    a photo-sensitive resistance with its resistance decreasing in response to illumination thereof and being connected between said control electrode and a power supply, whereby the potential at said control electrode is made to exceed said threshold potential to render said transistor conductive when said photo-sensitive resistance is illuminated by said spot; and
    a relay, responsive to current through said transistor, for selectively connecting said motor means to a power source, said relay being activated in response to current through said transistor to disconnect said motor means from the power supply.

6. The sun tracking system of claim 1, wherein said photo-sensor means comprises:
    a transistor, conductive in response to a potential of predetermined magnitude applied to the control electrode thereof;
    a photo-sensitive resistance with its resistance decreasing in response to illumination thereof and being connected between said control electrode and a power supply, whereby the potential at said control electrode is made to exceed said threshold potential to render said transistor conductive when said photo-sensitive resistance is illuminated by said spot; and
    a relay, responsive to current through said transistor, for selectively connecting said motor means to a power source, said relay being activated in response to current through said transistor to disconnect said motor means from the power supply.

7. A sun tracking system for aligning a body with sun comprising:
    reflector means, including a reflected surface and a mask contiguous to said reflected surface having an aperture therein, for reflecting a spot of sunlight on positions along a path on a surface, the position of said spot along said path being indicative of the alignment of said reflector means with the sun, said reflector means and said surface being fixedly disposed with respect to each other and with respect to said body;
    motor means, responsive to control signals applied thereto, for controllably rotating said body, deflector and surface in a direction in accordance with the relative motion of the sun and said body;
    first photo-sensor means, disposed on said path at a position corresponding to alignment between said body and said sun; and
    second photo-sensor means, disposed on said surface at a predetermined position on said path in close proximity to said first photo-sensor means, for generating a control signal to said motor means when illuminated by said spot to effect said rotation of said body, said first photo-sensor means inhibiting said second photo-sensor means when illuminated by said spot.

8. The sun tracking system of claim 7, further including third photo-sensor means, responsive to ambient light from the sun, for enabling said motor means with respect to said control signal from said second photo-sensor means when illuminated, and disabling said motor means when not illuminated by sun.

9. The sun tracking system of claim 8, wherein said second photo-sensor means comprises:
   a transistor, conductive in response to a potential of predetermined magnitude applied to the control electrode thereof;
   a photo-sensitive resistance having resistance which decreases in response to illumination thereof and being shunted across said control electrode, whereby illumination of said photo-sensitive resistance by said spot decreases the magnitude of the potential at said control electrode to render said transistor non-conductive;
   a relay, responsive to current through said transistor, for selectively connecting said motor means to a power source, said motor means being connected to said power source when said transistor is non-conductive; and
   wherein said first photo-sensor means comprises a further photo-sensitive resistance having a resistance which decreases when illuminated by said spot and being connected between said control electrode and a power supply, whereby the potential at said control electrode is made to exceed said threshold potential when said further photo-sensitive resistance is illuminated, to render said transistor conductive and activate said relay to disconnect said motor means from said power supply.

10. The sun tracking system of claim 7, wherein said second photo-sensor means comprises:
    a transistor, conductive in response to a potential of predetermined magnitude applied to the control electrode thereof;
    a photo-sensitive resistance having a resistance which decreases in response to illumination thereof and being shunted across said control electrode, whereby illumination of said photo-sensitive resistance by said spot decreases the magnitude of the potential at said control electrode to render said transistor non-conductive;
    a relay, responsive to current through said transistor, for selectively connecting said motor means to a power source, said motor means being connected to said power source when said transistor is non-conductive; and
    wherein said first photo-sensor means comprises a further photo-sensitive resistance having a resistance which decreases when illuminated by said spot and being connected between said control electrode and a power supply, whereby the potential at said control electrode is made to exceed said threshold potential when said furher photo-sensitive resistance is illuminated, to render said transistor conductive and activate said relay to disconnect said motor means from said power supply.

11. In a sun tracking system for aligning a body with the sun of the type including means for illuminating a photo-sensitive device in accordance with the relative alignment of the sun to said body, the improvement wherein said means for illuminating comprises:
    a reflective surface fixedly disposed with respect to said photo-sensitive device, and
    a mask having an aperture therein, contiguous to said reflecting surface, whereby said reflecting surface reflects only a spot of light to illuminate said photo-sensitive device.

12. A sun tracking system for aligning a body with the sun comprising:
    reflector means, a reflective surface and a mask contiguous to said reflective surface having an aperture therein, for reflecting a spot of sunlight on a position along a path, the position of said spot on said path being indicative of the alignment of said reflector means with the sun, said reflector means being fixedly disposed with respect to said body;
    motor means, responsive to control signals applied thereto for controllably rotating said body and said reflector means in a direction in accordance with the relative motion of the sun and said body; and
    photo-sensor means, including at least one photo-sensitive element disposed on said path for generating said control signals to said motor means.

13. The sun tracking system of claim 12, further including second photo-sensor means, responsive to ambient light from the sun, for enabling said motor means when illuminated, and disabling said motor means when not illuminated by the sun.

14. The sun tracking system of claim 12, wherein said photo-sensor means comprises:
    a transistor, conductive in response to a potential of predetermined magnitude applied to the control electrode thereof;
    a photo-sensitive resistance, said photo-resistance decreasing in response to illumination thereof, and being connected between said control electrode and a power supply, whereby the potential at said control electrode is made to exceed said threshold potential to render said transistor conductive when said photo-resistance is illuminated by said spot, said photo-sensitive resistance being disposed at the position on said path illuminated by said spot when said body is aligned with the sun; and
    a relay, responsive to current through said transistor, for selectively connecting said motor means to a power source, said relay being activated in response to current through said transistor to disconnect said motor means from the power supply.

15. A sun tracking system for aligning a body with the sun comprising:
    reflector means for reflecting sunlight to illuminate a discrete area disposed along a path, the position of said illuminated area along said path being indicative of the alignment of said reflector means with the sun, said reflector means being fixedly disposed with respect to said body;
    motor means for, when not inhibited, rotating said body, and said reflector means in a direction in accordance with the relative motion of the sun and said body; and
    photo-sensor means, disposed on said path at a position indicative of alignment between said body and sun, for generating a signal to inhibit said motor means when illuminated by said reflected sunlight.

16. The sun tracking system of claim 15, wherein said reflector means comprises:
    a reflective surface; and
    a mask contiguous to said reflective surface having an aperture therein.

17. The sun tracking system of claim 16, further including second photo-sensor means, responsive to ambient light from the sun, for enabling said motor means when illuminated, and disabling said motor means when not illuminated by the sun.

18. The sun tracking system of claim 17, wherein said photo-sensor means comprises:
   a transistor, conductive in response to a potential of predetermined magnitude applied to the control electrode thereof;
   a photo-sensitive resistance, said photo-resistance decreasing in response to illumination thereof, and being connected between said control electrode and a power supply, whereby the potential at said control electrode is made to exceed said threshold potential to render said transistor conductive when said photo-resistance is illuminated by said reflected sunlight; and
   a relay, responsive to current through said transistor, for selectively connecting said motor means to a power source, said relay being activated in response to current through said transistor to disconnect said motor means from the power supply.

19. The sun tracking system of claim 15, further including second photo-sensor means, responsive to ambient light from the sun, for enabling said motor means when illuminated, and disabling said motor means when not illuminated by the sun.

20. The sun tracking system of claim 19, wherein said photo-sensor means comprises:
   a transistor, conductive in response to a potential of predetermined magnitude applied to the control electrode thereof;
   a photo-sensitive resistance with its resistance decreasing in response to illumination thereof and being connected between said control electrode and power supply, whereby the potential at said control electrode is made to exceed said threshold potential to render said transistor conductive when said photo-sensitive resistance is illuminated by said reflected sunlight; and
   a relay, responsive to current through said transistor, for selectively connecting said motor means to a power source, said relay being activated in response to current through said transistor to disconnect said motor means from said power supply.

21. The sun tracking system of claim 15, wherein said photo-sensor means comprises:
   a transistor, conductive in response to a potential of predetermined magnitude applied to the control electrode thereof;
   a photo-sensitive resistance with its resistance decreasing in response to illumination thereof and being connected between said control electrode and a power supply, whereby the potential at said control electrode is made to exceed said threshold potential to render said transistor conductive when said photo-sensitive resistance is illuminated by said reflected sunlight; and
   a relay, responsive to current through said transistor, for selectively connecting said motor means to a power source, said relay being activated in response to current through said transistor to disconnect said motor means from the power supply.

22. A sun tracking system for aligning a body with sun comprising:
   reflector means for reflecting sunlight to illuminate a discrete area on a surface disposed along a path on the surface, the position of said illuminated area along said path being indicative of the alignment of said reflector means with the sun, said reflector means and said surface being fixedly disposed with respect to each other and with respect to said body;
   motor means, responsive to control signals applied thereto, for controllably rotating said body, reflector and surface in a direction in accordance with the relative motion of said sun and said body;
   first photo-sensor means, disposed on said path at a position corresponding to alignment between said body and said sun; and
   second photo-sensor means, disposed on said surface at a predetermined position on said path in close proximity to said first photo-sensor means, for generating a control signal to said motor means when illuminated by said reflected sunlight to effect rotation of said body, said first photo-sensor means inhibiting said second photo-sensor means when illuminated by said reflected sunlight.

23. The sun tracking system of claim 22, wherein said reflector means comprises:
   a reflected surface; and
   a mask contiguous to said reflected surface having an aperture therein.

24. The sun tracking system of claim 23, further including third photo-sensor means, responsive to ambient light from the sun, for enabling said motor means with respect to said control signal from said second photo-sensor means when illuminated, and disabling said motor means when not illuminated by the sun.

25. The sun tracking system of claim 24, wherein said second photo-sensor means comprises:
   a transistor, conductive in response to a potential of predetermined magnitude applied to the control electrode thereof;
   a photo-sensitive resistance having resistance which decreases in response to illumination thereof and being shunted across said control electrode, whereby illumination of said photo-sensitive resistance by said reflected sunlight decreases the magnitude of the potential at said control electrode to render said transistor non-conductive;
   a relay, responsive to current through said transistor, for selectively connecting said motor means to a power source, said motor means being connected to said power source when said transistor is non-conductive; and
   wherein said first photo-sensor means comprises a further photo-sensitive resistance having a resistance which decreases when illuminated by said reflected sunlight and being connected between said control electrode and a power supply, whereby the potential at said control electrode is made to exceed said threshold potential when said further photo-sensitive resistance is illuminated, to render said transistor conductive and activate said relay to disconnect said motor means from said power supply.

26. The sun tracking system of claim 22, wherein said second photo-sensor means comprises:
   a transistor, conductive in response to a potential of predetermined magnitude applied to the control electrode thereof;
   a photo-sensitive resistance having a resistance which decreases in response to illumination thereof and being shunted across said control electrode, whereby illumination of said photo-sensitive resistance by said reflected sunlight decreases the magnitude of the potential at said control electrode to render said transistor non-conductive;

a relay, responsive to current through said transistor, for selectively connecting said motor means to a power source, said motor means being connected to said power source when said transistor is non-conductive; and wherein said first photo-sensor means comprises a further photo-sensitive resistance having a resistance which decreases when illuminated by said reflected sunlight and being connected between said control electrode and a power supply, whereby the potential at said control electrode is made to exceed said threshold potential when said further photo-sensitive resistance is illuminated, to render said transistor conductive and activate said relay to disconnect said motor means from said power supply.

27. A sun tracking system for aligning a body with the sun comprising:

reflector means for reflecting sunlight to illuminate a small discrete area disposed along a path, the position of said illuminated area on said path being indicative of the alignment of said reflector means with the sun, said reflector means being fixedly disposed with respect to said body;

motor means, responsive to control signals applied thereto for controllably rotating said body and said reflector means in a direction in accordance with the relative motion of the sun and said body; and photo-sensor means, including at least one photo-sensitive element disposed on said path for generating said control signals to said motor means.

28. The sun tracking system of claim 27, wherein said reflector means comprises:

a reflective surface; and a mask contiguous to said reflective surface having an aperture therein.

29. The sun tracking system of claim 28, further including second photo-sensor means, responsive to ambient light from the sun, for enabling said motor means when illuminated, and disabling said motor means when not illuminated by the sun.

30. The sun tracking system of claim 27, wherein said photo-sensor means comprises:

a transistor, conductive in response to a potential of predetermined magnitude applied to the control electrode thereof;

a photo-sensitive resistance, said photo-resistance decreasing in response to illumination thereof, and being connected between said control electrode and a power supply, whereby the potential at said control electrode is made to exceed said threshold potential to render said transistor conductive when said photo-resistance is illuminated by said reflected sunlight, said photo-sensitive resistance being disposed at the position on said path illuminated by said reflected sunlight when said body is aligned with the sun; and a relay, responsive to current through said transistor, for selectively connecting said motor means to a power source, said relay being activated in response to current through said transistor to disconnect said motor means from the power supply.

* * * * *